US006993991B2

(12) United States Patent
Baasch et al.

(10) Patent No.: US 6,993,991 B2
(45) Date of Patent: Feb. 7, 2006

(54) GEAR SELECTOR DEVICE FOR A MOTOR VEHICLE

(75) Inventors: Detlef Baasch, Friedrichshafen (DE); Ralf Dreibholz, Meckenbeuren (DE); Gerhard Gumpoltsberger, Friedrichshafen (DE); Michael Ebenhoch, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 70 days.

(21) Appl. No.: 10/762,389

(22) Filed: Jan. 22, 2004

(65) Prior Publication Data

US 2004/0244516 A1 Dec. 9, 2004

(30) Foreign Application Priority Data

Jan. 23, 2003 (DE) ................................ 103 02 502

(51) Int. Cl.
*F16H 3/14* (2006.01)
*F16H 3/08* (2006.01)

(52) U.S. Cl. .......................................... 74/355; 74/360

(58) Field of Classification Search .......... 74/335–376, 74/325; 192/3.57, 87

See application file for complete search history.

(56) References Cited

U.S. PATENT DOCUMENTS 796,989 A 8/1905 Enrico
2,170,538 A * 8/1939 Sarver ..................... 192/87.12
3,349,635 A * 10/1967 Richards ...................... 74/331
3,424,285 A * 1/1969 McRay ..................... 192/18 A
3,425,293 A * 2/1969 Krawczyk et al. ............ 74/360
3,834,503 A * 9/1974 Maurer et al. ......... 192/113.35
3,889,790 A * 6/1975 Bricker ................... 192/85 AT
4,763,765 A * 8/1988 Black ...................... 192/48.91
5,950,490 A * 9/1999 Di Stefano .................. 74/333
6,315,691 B1 * 11/2001 Fredriksen et al. ........... 475/72

FOREIGN PATENT DOCUMENTS

DE 37 11 490 C2 4/1995
EP 1 055 835 A1 4/2000

* cited by examiner

*Primary Examiner*—Tisha Lewis
(74) *Attorney, Agent, or Firm*—Davis & Bujold, P.L.L.C.

(57) ABSTRACT

A gear selector device for a transmission of a motor vehicle in which at least one gear wheel 2, 3 and one sliding sleeve 4 are situated upon one transmission shaft 1. For axial displacement of the sliding sleeve 4 upon the transmission shaft 1, a pressure-medium actuatable shifting device 45 is used which is supplied with a control pressure medium through a hole 10 within the transmission shaft 1. When several such sliding sleeves 4, 20 are disposed upon such a transmission shaft 1, there results a higher total construction cost for the control pressure supply thereof. The object of the invention is a transmission shaft 1 having several sliding sleeves 4, 20 to reduce the total construction cost for the axial displacement of the sliding sleeves 4, 20. To the end, it is provided that the shifting devices 45, 46 of the sliding sleeves 4, 20 can be supplied independently of each other with a control pressure medium through one common pressure medium hole 6 in the transmission shaft 1.

11 Claims, 2 Drawing Sheets

GEAR SELECTOR DEVICE FOR A MOTOR VEHICLE

This application claims priority from German Application Serial No. 103 02 502.2 filed Jan. 3, 2003.

FIELD OF THE INVENTION

The invention relates to a gear selector device for a motor vehicle.

BACKGROUND OF THE INVENTION

In such conventional gear selector devices two gear wheels are rotatably supported and spaced from each other on a transmission shaft. In addition, a sliding sleeve is non-rotatably and axially movably are supported between both gear wheels on the transmission shaft. By axial movement, the sliding sleeve can be brought to positive fit engagement with the first or the second gear wheel and thereby switch the transmission between the two ratio steps. The axial motion of the sliding sleeve is controlled by a shift fork radially acting from the outside upon the sliding sleeve. This solution implies a relatively large radial installation space, its construction cost is high and is susceptible to interferences.

From DE 37 11 490 C2 is known besides a gear selector device in which the sliding sleeve is axially moved not by a shift fork radially engaging from the outside but by means of a hydraulic device actuated from the inside, via axial holes extending within the transmission shaft. Thereby the radial height of this gear selector device is advantageously reduced. This solution thus has advantages regarding the weight and the number of mechanical parts needed. A disadvantage consists in there being provided in the transmission shaft holes for the pressurized oil and pistons actuated by an oil pressure for the axial movement of the sliding sleeve. That is relatively expensive functionally and requires a large shaft diameter.

In EP 1 055 835 A1 has further been disclosed a hydraulically actuated sliding sleeve supplied with control pressure from the interior of the transmission shaft and providing the hydraulic shifting device for the sliding sleeve outside the transmission shaft between two gear wheels so that the transmission shaft contains only the adequate axially extending supply holes for the oil pressure.

These two already known hydraulic actuation devices thus serve for axial displacement of the sliding sleeve of a selector transmission between two gear wheels as a rule disposed upon a transmission shaft. If several such arrangements of hydraulically actuated gear wheels and sliding sleeves, independent of each other, are located upon a transmission shaft, a relatively higher total cost results for the independent control of the individual sliding sleeves.

Therefore, the problem on which the invention is based is to reduce in such a gear selector device having several gear wheels and sliding sleeves associated with a transmission shaft, the construction cost needed for actuation of the individual sliding sleeves, the total weight and the susceptibility to interferences.

SUMMARY OF THE INVENTION

In the invention are thus supported upon the transmission shaft several consecutively offset systems in axial direction consisting each of one sliding sleeve and at least one gear wheel, wherein shifting devices acting upon the sliding sleeves can be supplied with pressure medium independently of each other through a common pressure medium hole in the transmission shaft.

The resulting advantage resulting thereby is that, via the same pressure medium hole in the transmission shaft, all systems supported on the transmission shaft consisting each of at least one gear wheel and one sliding sleeve can be actuated with adequate control means whereby the construction total expense is reduced in comparison with the prior art. The invention works not with separate control means, but with a control pressure medium supply common to all sliding sleeves which can optionally act upon each one of the sliding sleeves for performing a concrete gear change operation.

Due to the fact that in the transmission shaft, no pistons but only one pressure medium hole is made or one pressure medium pipe is supported, the production of the transmission shaft is not unnecessarily complicated. The total construction expense is kept low, especially by the fact that for the individual systems consisting each of one sliding sleeve and at least one gear wheel, no separate control means are needed, but several parts, such as the transmission shaft and the holes therein provided for oil supply, serve in common for all sliding sleeves.

In a preferred embodiment of the invention, centrally in the transmission shaft, one pressure medium pipe is axially movably supported which has, on the periphery extending over an axial section, a clearance which is connected via a radial hole with the interior of the pressure medium pipe. The pressure medium pipe is axially movable in the transmission shaft so that the clearance can optionally reach the area of several radial holes in the transmission shaft leading each to the shifting device of one of several sliding sleeves. Therefore, the pressure medium pipe within the transmission shaft advantageously forms the common control means for control of all the systems to be controlled. The control is easily switched between the different sliding sleeves on the transmission shaft only by axial displacement of the pressure medium pipe within the transmission shaft.

The clearance on the external periphery of the pressure medium pipe is preferably formed by an axial section of the pressure medium pipe having a reduced outer diameter. On its axially opposite ends, the clearance is here preferably sealed, relative to the inner wall of the transmission shaft, by annular seals.

In another embodiment of the invention, the pressure medium pipe contains outside the transmission shaft one flange with acting faces on the front side for pressurization by the pressure medium for axial displacement of the pressure medium pipe in the transmission shaft. This solution makes a simple hydraulically controlled switching possible on the individual sliding sleeves by axial displacement of the pressure medium pipe within the transmission shaft.

In one development of the invention, between the outer side of the pressure medium pipe and the inner side of the transmission shaft is located one star-shaped distributor in the form of a pipe which, on its outer side, has radially outwardly pointing and axially extending rebs between which are formed several axially extending chambers separated from each other and distributed over the periphery. Each chamber contains one supply hole leading to the pipe interior of the star-shaped distributor. The supply holes of the individual chambers are axially and/or radially offset against each other.

The pressure medium supply holes in the transmission shaft are arranged so that each pressure medium supply hole of the transmission shaft can be loaded with pressure medium only from a certain chamber of the star-shaped distributor. Therefore, the individual chambers of the star-shaped distributor form between its outlet point from the pressure medium pipe and the pressure medium supply hole in the transmission shaft, separate supply ducts for the pressure medium to the respective sliding sleeve.

Due to the fact that the pressure medium is not guided over the whole periphery, but into one of several separate chambers over the periphery, the pressure medium volume needed for each sliding sleeve is reduced and, should that be the case, the response time. Besides, the length of the pressure medium pipe can be reduced, since on account of the axial guide ducts formed by the chambers, the exit point of the pressure medium from the pressure medium pipe does not indispensably have to lie on the place of the controlled system.

BRIEF DESCRIPTION OF THE DRAWINGS

The invention will now be described, by way of example, with reference to the accompanying drawings in which.

DETAILED DESCRIPTION OF THE INVENTION

Figure 1:
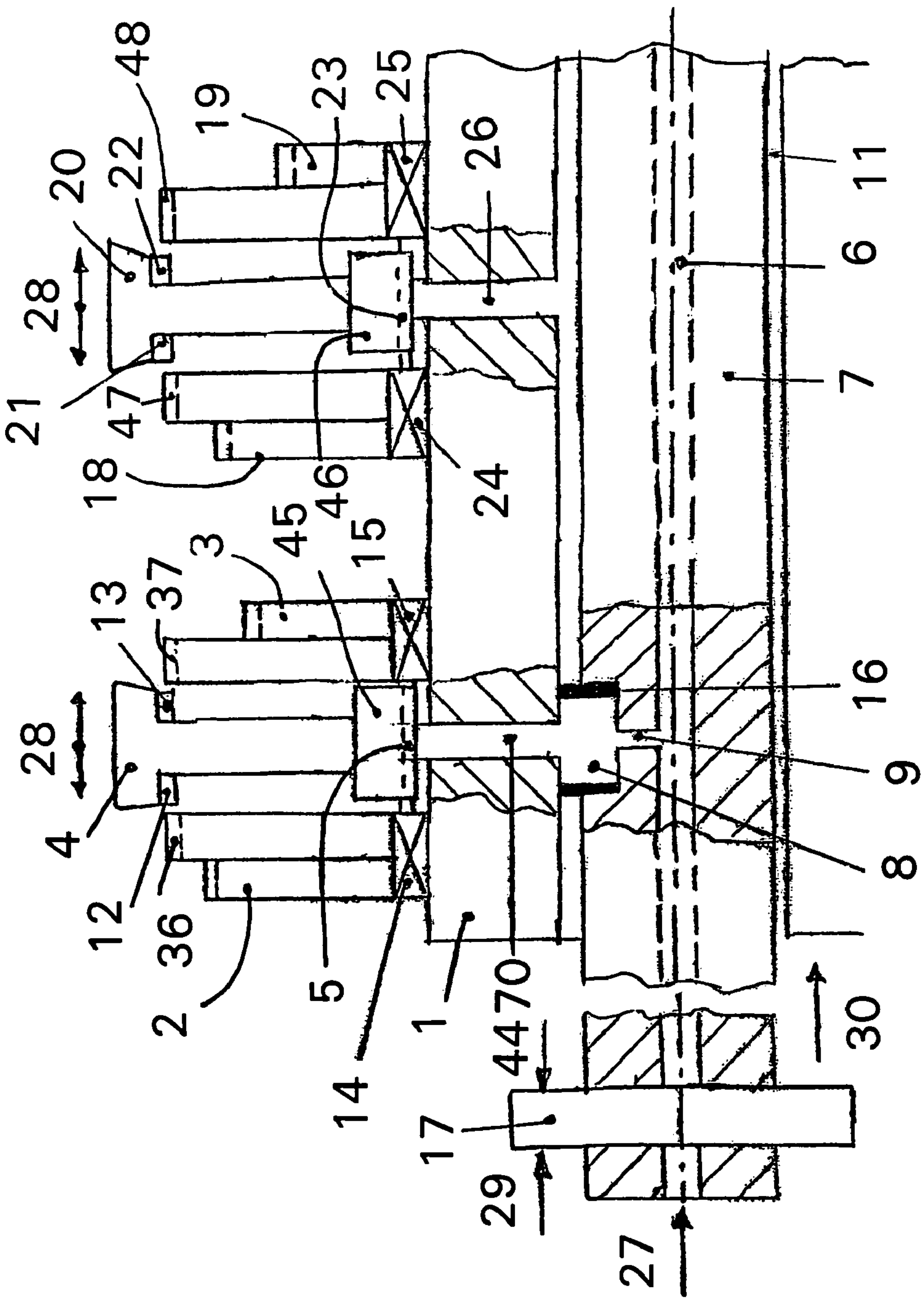
FIG. 1 is a diagrammatic cross section of one variation of the inventive gear selector device.

In FIG. 1 is shown the principle of the inventive selector device in a simplified cross sectional drawing. In this drawing is shown a transmission shaft 1 situated upon two pairs of gear wheels 2, 3 and 18, 19. The gear The gear wheels 2, 3 and 18, 19 each have two gear rings available wherein the gear rings are axially pointing away from a respective sliding sleeve 4, 20 and have a diameter corresponding to the respective ratio or reduction ratio, while gear rings 36, 37 and 47, 48 axially pointing to the sliding sleeves 4, 20 serve for the mechanical connection of the gear wheels 2, 3 and 18, 19 with respective inner toothings 12, 13 and 21, 22 of the sliding sleeves 4, 20.

The gear wheels 2, 3 and 18, 19 are further designed as idler gears and, via radial bearings 14, 15 and 24, 25, rotatably supported upon the transmission shaft 1. The sliding sleeves 4, 20 are secured against rotation upon the transmission shaft 1 by sliding toothings 5 or 23 and axially slidably supported on the transmission shaft 1.

For axially moving the sliding sleeves 4, 20 one control pressure supply is provided in which, in one axial bore 11 in the transmission shaft 1, is axially movably supported one pressure medium pipe 7 provided with a central oil supply hole 6. Outside the transmission shaft 1, the pressure medium pipe 7 contains one flange 17 the operation of which will be explained below. In addition, on one place, the pressure medium pipe 7 has a clearance 8 formed by a reduced outer diameter of the pressure medium pipe 7 and connected with the oil supply hole 6 via a connecting hole 9.

Relative to the transmission shaft 1, the clearance 8 is further sealed, via seals 16, preferably in the form of O-rings and preferably contained only once in the transmission shaft 1. In addition, FIG. 1 shows that the sliding sleeve 4 is connected with an axially operative shifting device 45 actuatable by pressure medium which can alternatively be supplied via at least one oil supply hole 10 with the control pressure medium from the clearance 8 of the pressure medium pipe 7. For switching the shifting device 45, two separate and adjacent oil supply holes 10*a*, 10*b* (not shown here) can also be used, respectively.

FIG. 1 shows that the sliding sleeve 20 of the second pair of gear wheels 18, 19 disposed axially offset upon the transmission shaft 1 has available one axially operative shifting device 46. The shifting device 46 can be connected in the transmission shaft 1, via an oil supply hole 26 or by two oil supply holes 26*a*, 26*b* (not shown here), with the clearance 8 of the pressure medium pipe 7; insofar as the pressure medium pipe 7 is axially sufficiently displaced in the direction to an oil supply hole 26.

The mode of operation of this device can be shown as follows; For a non-rotatable connection of one of the gear wheels 2, 3 with the transmission shaft 1, a control pressure medium, preferably hydraulic oil, is introduced with pressure in a direction 27 in the oil supply hole 6; it reaches the clearance 8, via the connecting hole 9 and from there, via the oil supply hole 10, the axially operative shifting device 45.

The shifting device 45 is designed so that the sliding sleeve 4 can be moved axially by oil pressure in both directions 28 so as to make possible bringing to positive fit engagement in the gear wheel 3 either the inner toothing 12 of the sliding sleeve 4 with the synchronizer toothing 36 of the gear wheel 2 or the inner toothing 13 of the sliding sleeve 4 with the synchronizer toothing 37. In this axial position of the pressure medium pipe 7, the sliding sleeve 20 of the right gear wheel pair 18, 19 cannot be controlled.

For adequate control of the sliding sleeve 20 of the right gear wheel pair 18, 19, the left front face of the flange 17 is loaded with oil pressure in a direction 29. Thereby the pressure medium pipe 7 is moved axially into a bore 11 in direction 30 until the clearance 8 reaches the area of the oil supply hole 26 so that the sliding sleeve 20 of the right gear wheel pair 18, 19 can now be actuated in the manner described.

By virtue of this layout supported on the transmission shaft 1, several axially offset gear wheel pairs 2, 3; 18, 19 can be independently of each other non-rotatably connected with the transmission shaft 1 only by axial movement of the pressure medium pipe 7. The pressure medium pipe 7 is axially displaced in an opposite direction by oil pressure upon the flange 17 in a direction 44 or by means of a recoil spring (not shown here), which engages in the end of the pressure medium pipe 7 that points away from the flange 17.

Figure 2:
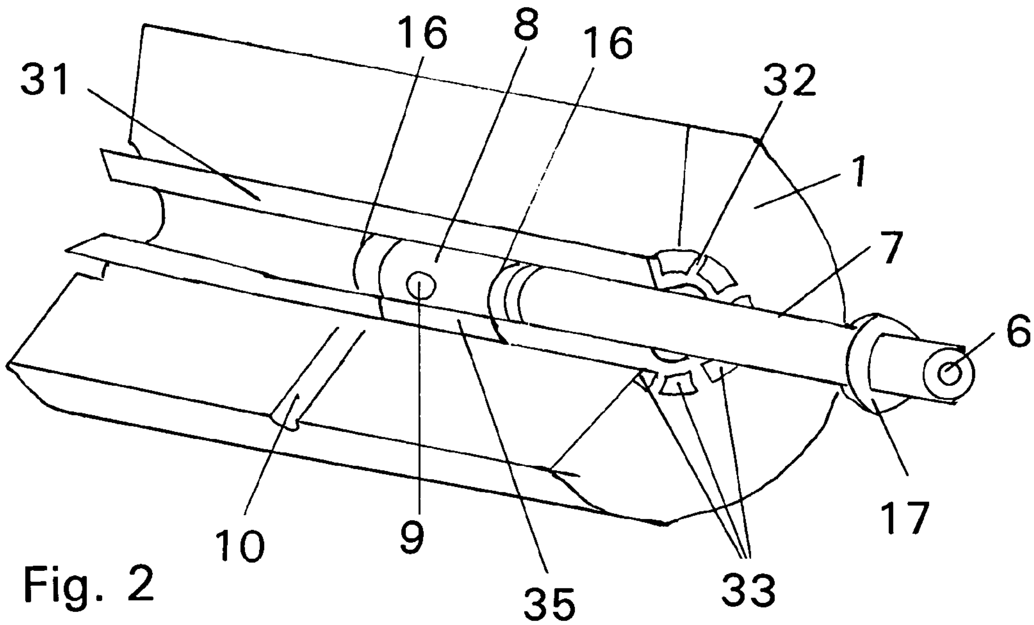
FIG. 2 is a partial perspective view of one development of the gear selector device according to FIG. 1.

FIG. 2 shows a partial view of the transmission shaft 1 without the gear wheel pairs arranged thereon. Again are shown according to FIG. 1, the oil supply hole 6, the pressure medium pipe 7, the clearance 8, the connecting hole 9, the oil supply hole 10 leading to the sliding sleeve 4, the seals 16 and the flange 17. The difference from FIG. 1 consists in that in the bore 11 of the transmission shaft 1, between the pressure medium pipe 7 in the wall of the bore of the transmission shaft 1, an additional tubular star-shaped distributor 31 is non-rotatably and axially immovably disposed or designed.

On its periphery, the tubular star-shaped distributor 31 comprises several outwardly oriented and axially extending ribs 32 between which are designed separate chambers 33 distributed on the periphery and serving as supply spaces for pressurized oil. The chambers 33 each have one supply hole 35 in the star-shaped distributor 31 through which, while the pressure medium pipe 7 is in a corresponding position, pressurized oil can flow from its clearance 8 into the respective chamber 33.

Each one of the individual chambers 33 can be separately loaded with pressurized oil, via the pressure medium pipe 7, the connecting hole 9, the clearance 8 and the supply hole 35 associated with the chamber 33. These supply holes 35 associated with the individual chambers 33 are arranged axially and/or radially offset relative each other and connect by control pressure technique; the oil supply holes 10, 26 leading to the sliding sleeves 4, 20 in the transmission shaft 1 with the clearance 8 of the pressure medium pipe 7.

The mode of operation in the device, according to FIG. 2, is the following. The pressurized oil first reaches from the oil supply hole 6, the pressure medium pipe 7, via the connecting hole 9 in the clearance 8 which is only once provided upon the pressure medium pipe 7. By axial displacement of the pressure medium pipe 7 in the transmission shaft 1, only one of the supply holes 35 can each time reach the area of the clearance 8 so that the oil can reach via the corresponding supply hole 35 one of the respective chambers 33. Each one of the several oil supply holes 10, 26 in the transmission shaft 1, of which only the oil supply hole 10 is shown in FIG. 2, is thus associated only with one specific chamber 33.

Such a chamber 33 therefore serves for oil supply for the axial displacement of the sliding sleeve 4 of a respective specific gear wheel pair 2, 3 on the transmission shaft 1. The pressurized oil thus arrives, via the oil supply hole 6, the connecting hole 9, one of the supply holes 35 and one of the oil supply holes 10, at the sliding sleeve 4 to be controlled.

Contrary to FIG. 1, it can be seen that the pressurized oil for control of a specific sliding sleeve 4 occupies only part of the periphery, namely, one of the chambers 33. The chambers 33 form separate supply ducts for the pressurized oil to the respective oil supply hole 10. Thereby it becomes clear that, contrary to the variant of the invention, according to FIG. 1, for the control of the sliding sleeve 4 of a gear wheel pair 2, 3, the respective oil supply hole 10, 26 loaded with oil pressure has to lie not in the area of the clearance 8 but only in the area of one of the supply holes 35. Essential advantages of the star-shaped distributor 31 are thus a reduction of the oil volume of a control duct during the supply to the corresponding oil supply hole 10, 26 and a possible reduction of the length of the pressure medium pipe 7.

Figure 3:
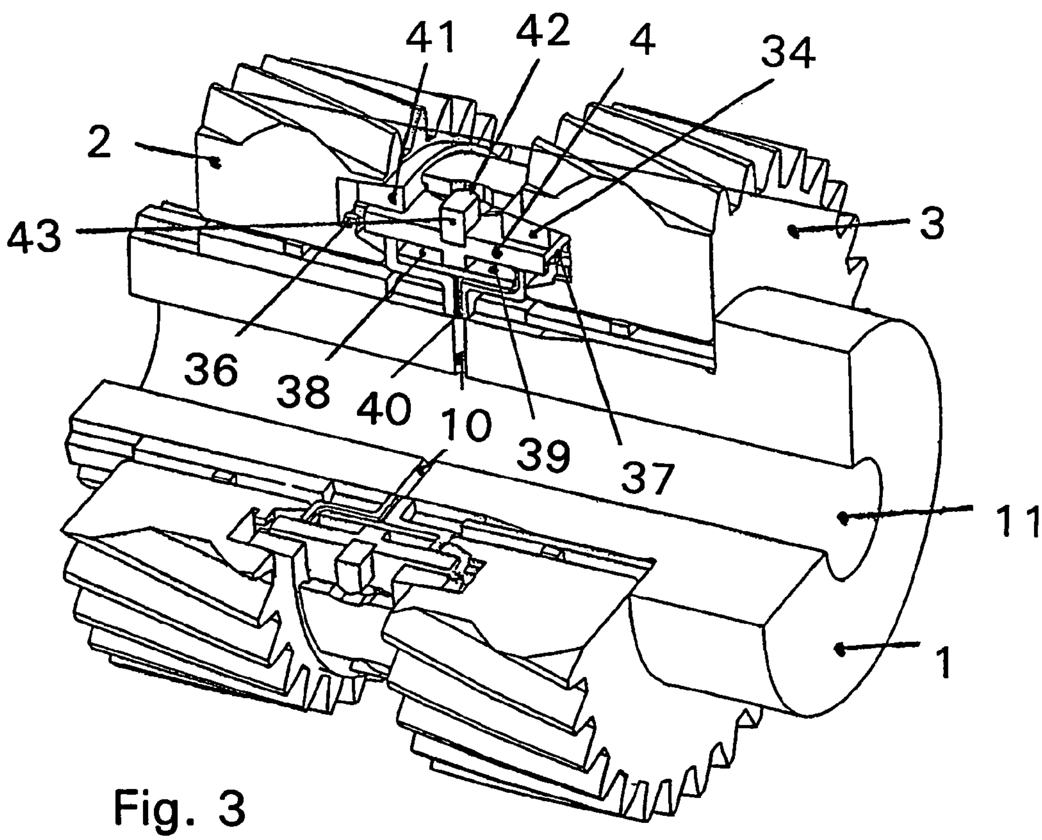
FIG. 3 is a partial perspective view of the gear selector device with two gear wheels and one sliding sleeve.

In a partial perspective illustration, FIG. 3 shows the gear wheel pair 2, 3, according to FIG. 1 where, for the sake of clarity, the pressure medium pipe 7 extending into the hole 11 has been omitted. Accordingly, the two gear wheels 2, 3, the sliding sleeve 4 located between said gear wheels and the oil supply hole 10 are shown. Further shown are the synchronizer toothings 36, 37 for positive fit engagement of the sliding sleeve 4 in the gear wheel 2 of 3, two oil spaces 38, 39 in the area in the area of the sliding sleeve 4, one axially aligned shaft toothing 40 between the sliding sleeve 4 and the transmission shaft 1, friction faces 34, 41 on both gear wheels 2, 3, a spline slope 42 and a spline 43 on the sliding sleeve 4.

To effect an axial displacement of the sliding sleeve 4 oriented toward the gear wheel 2 or to the gear wheel 3, the pressurized oil also reaches in this illustration, via the oil supply hole 10, one of the two oil spaces 38, 39 of the shifting device for the sliding sleeve 4. When, for example, the oil space 38 has been loaded with pressurized oil, the sliding sleeve 4 is moved to the right and at the same time the friction cone 34 is pressed via a centering spring, not visible in FIG. 3, against the friction face of the gear wheel 3. By virtue of the revolution generated by the rotational speed difference between the transmission shaft 1 and the gear wheel 3, the spline slope 42 engages before the toothing 37. But the toothing 37 can only be brought to engagement when the sliding sleeve 4 and the corresponding gear wheel 3 have an approximately equal rotational speed so that the sliding sleeve 4 is subsequently coupled with positive fit with the gear wheel 3.

The outer friction cone 34 and the inner friction face on the gear wheel 3 thus serve the purpose that when the sliding sleeve 4 and the gear wheel 3 are approximated at different rotational speeds of sliding sleeve 4 and gear wheel 3, by a frictional engagement between said two parts the rotational speeds is first brought close so that at equal or sufficiently equal rotational speeds, the positive fit engagement of the sliding sleeve 4 and the gear wheel 3 can take place.

For example, when due to the loading of the oil space 38 with oil pressure via the toothing 37, the sliding sleeve 4 is brought to positive fit engagement with the gear wheel 3, to release said engagement, that is, to remove the transmission gear existing until then, the oil space 39 is loaded with pressure via one other supply hole (not shown here) so that the sliding sleeve 4 moves to the left.

In case of further continued pressurization of the pressure space 39, the sliding sleeve 4 is moved far enough to the left for the parts thereof to provide, as described above, for an adaptation of the rotational speeds of the transmission shaft 1 and the gear wheel 2 until the gear wheel 2 becomes non-rotatably connected with the transmission shaft 1 via the sliding sleeve 4. But the sliding sleeve can also be reset to neutral position by means of one spring axially acting against the sliding sleeve 4.

For actuation of the sliding sleeve 4 and the axial movement of the pressure medium pipe via the flange 17, it is possible to use another medium instead of oil, such as another fluid or a gaseous medium. But the axial movement of the pressure medium pipe 7 in the transmission shaft 1 can also be produced mechanically, via a shifting means, acting upon the pressure medium pipe 7 or also by an electromechanical drive. The number of gear wheel pairs actuatable independently of each other, two in the instant example, can also be arbitrary.

| Reference numerals | |
|---|---|
| 1 | transmission shaft |
| 2 | gear wheel |
| 3 | gear wheel |
| 4 | sliding sleeve |
| 5 | sliding toothing |
| 6 | oil supply hole |
| 7 | pressure medium pipe |
| 8 | clearance |
| 9 | connecting hole |
| 10 | oil supply hole |
| 11 | bore |
| 12 | inner toothing |
| 13 | inner toothing |
| 14 | radial bearing |
| 15 | radial bearing |
| 16 | seal |
| 17 | flange |
| 18 | gear wheel |
| 19 | gear wheel |
| 20 | sliding sleeve |
| 21 | inner toothing |
| 22 | inner toothing |
| 23 | sliding toothing |
| 24 | radial bearing |
| 25 | radial bearing |
| 26 | oil supply hole |
| 27 | direction |
| 28 | direction |

-continued

| Reference numerals | |
|---|---|
| 29 | direction |
| 30 | direction |
| 31 | star-shaped distributor |
| 32 | ribs |
| 33 | chambers |
| 34 | friction cone |
| 35 | supply hole |
| 36 | synchronizer toothing, gear rings |
| 37 | synchronizer toothing, gear rings |
| 38 | oil space |
| 39 | oil space |
| 40 | toothing |
| 41 | friction cone |
| 42 | spline |
| 43 | spline |
| 44 | direction |
| 45 | shifting device |
| 46 | shifting device |
| 47 | synchronizer toothing, gear rings |
| 48 | synchronizer toothing, gear rings |

What is claimed is:

1. A gear selector device for a motor vehicle transmission comprising:

a transmission shaft (1) having a single axial bore (11), and a plurality of gear wheel systems (2, 3, 18, 19, 4, 20, 45, 46) offset from each other in an axial direction along the transmission shaft (1), each gear wheel system (2, 3, 18, 19, 4, 20, 45, 46) including:

at least one gear wheel (2, 3; 18, 19) rotatably mounted on the transmission shaft (1), and a sliding sleeve (4, 20) unrotatably and axially movably supported on the transmission shaft (1) so that the sliding sleeve (4, 20) can be independently and selectably coupled with at least one of the at least one gear wheel (2, 3, 18, 19) by axial displacement of the sliding sleeve (4, 20), wherein the axial displacement results of the sliding sleeve (4, 20) is actuated by a corresponding shifting device (45, 46) that is independently and selectably actuatable by a pressure medium provided through a corresponding pressure medium supply hole (10, 26) extending from the axial bore (11) of the transmission shaft (1), and a pressure medium pipe (7) supported and axially movable in the axial bore (11) of the transmission shaft (1) and having an axially extending pressure medium hole (6) connected with an axially extending displacement space (8) on the periphery of the pressure medium pipe (7), whereby the shifting device (45, 46) of a selected one of the plurality of gear wheel sets is selected for actuation by axial movement of the pressure medium pipe (7) to position the displacement space (8) in a region of the corresponding pressure medium supply hole (10, 26).

2. A gear selector device for a motor vehicle transmission comprising:

a transmission shaft (1) having a single axial bore (11), and a plurality of gear wheels (2, 3, 18, 19) rotatably mounted on the transmission shaft (1), a plurality of shifting devices (45, 46), each shifting device (46, 46) being connected to the axial bore (10) of the transmission shaft (1) by at least one pressure medium supply hole (10, 26) and actuatable by a pressure medium to couple a corresponding gear wheel (2, 3, 18, 19) to the transmission shaft (1), an hollow axially moveable pressure medium pipe (7) supported in the axial bore (11) of the transmission shaft (1) and having a radial pressure medium hole (6) extending to the periphery of the pressure medium pipe (7), whereby a shifting device is selectively actuated by alignment of the radial pressure medium hole (6) of the pressure medium pipe (7) with the corresponding pressure medium supply hole (10, 26) of the shifting device (45, 46).

3. The gear selector device according to claim 1, wherein said displacement space (8) is formed by an axial section of said pressure medium pipe (7) having reduced outer diameter.

4. The gear selector device according to claim 1, wherein two axially opposite ends of said displacement space (8) in said pressure medium pipe (7) are sealed by annular seals (16) opposite inner wall of said transmission shaft (1).

5. The gear selector device according to claim 1, wherein said pressure medium pipe (7) is provided outside said transmission shaft (1) with one flange (17) which has on a front side at least one acting face for pressurization by the pressure medium for axial displacement of said pressure medium pipe (7) in said transmission shaft (1).

6. The gear selector device according to claim 1, wherein between an outer side of said pressure medium pipe (7) and the an inner side of said transmission shaft (1) lies one star-shaped distributor (31) having a central pipe which on its outer side has radially outwardly pointing and axially extending ribs (32) between which are formed several axially extending individual chambers (33) separated from each other and distributed over the periphery.

7. The gear selector device according to claim 6, wherein each chamber (33) has one supply hole (35) leading to the pipe interior of said star-shaped distributor (31).

8. The gear selector device according to claim 7, wherein said supply holes (35) of said axially extending individual chambers (33) are axially and/or radially offset against each other.

9. The gear selector device according to claim 6, wherein each pressure medium supply hole (10, 26) in said transmission shaft (1) is disposed offset in a peripheral direction with respect to other pressure medium supply holes (10, 26) so that each pressure medium supply hole (10, 26) can be loaded with pressure medium only by one specific chamber (33) of said star-shaped distributor (31).

10. The gear selector device according to claim 1, wherein said sliding sleeve (4, 20) is coupled with said shifting device (45, 46) having two pressure spaces (38, 39) which, for the axially opposite displacement of said sliding sleeve (4, 20), can be loaded with a control pressure medium by at least one pressure medium hole (10) in said transmission shaft (1).

11. The gear selector device according to claim 1, wherein said gear wheels (2, 3) have rib faces radially pointing toward said transmission shaft (1) and upon which outer friction cones (34, 41) of said sliding sleeve (4) can be applied.

* * * * *